United States Patent [19]
Itabashi et al.

[11] Patent Number: 5,349,405
[45] Date of Patent: Sep. 20, 1994

[54] SINGLE LENS REFLEX CAMERA

[75] Inventors: Tomoaki Itabashi; Masayuki Misawa, both of Tokyo, Japan

[73] Assignee: Asahi Kogaku Kogyo Kabushiki Kaisha, Tokyo, Japan

[21] Appl. No.: 162,845

[22] Filed: Dec. 7, 1993

Related U.S. Application Data

[63] Continuation of Ser. No. 944,317, Sep. 14, 1992.

[30] Foreign Application Priority Data

Oct. 9, 1991 [JP] Japan .................................. 3-102253

[51] Int. Cl.⁵ ............................................ G03B 19/12
[52] U.S. Cl. .................... 354/152; 354/153; 354/156
[58] Field of Search .......... 354/152, 153, 156

[56] References Cited

U.S. PATENT DOCUMENTS

| | | |
|---|---|---|
| 3,812,509 | 5/1974 | Westphalen . |
| 3,893,141 | 7/1975 | Uno et al. . |
| 4,179,206 | 12/1979 | Tezuka et al. . |
| 4,195,925 | 4/1980 | Ishii et al. . |
| 4,260,232 | 4/1981 | Ueda et al. . |
| 4,360,257 | 11/1982 | Kurei . |

FOREIGN PATENT DOCUMENTS

| | | |
|---|---|---|
| 881980 | 11/1960 | United Kingdom . |
| 998197 | 7/1965 | United Kingdom . |
| 1549509 | 8/1979 | United Kingdom . |
| 2070259 | 9/1981 | United Kingdom . |

*Primary Examiner*—Monroe H. Hayes
*Attorney, Agent, or Firm*—Sandler Greenblum & Bernstein

[57] ABSTRACT

A single lens reflex camera includes a mirror box provided in a camera body to support a mirror located on an optical axis of a photographing lens for up and down movement. The mirror box, together with a mirror driving mechanism, is detachably attachable to the camera body as a unit. A diaphragm control mechanism is provided for controlling a diaphragm, which is mounted to a mounting member separate from the mirror box to form a unit, which can be detachably attached to the camera body. A charge/reset mechanism is provided and is mounted to the camera body and serves to connect the mirror drive mechanism and the diaphragm control mechanism.

20 Claims, 13 Drawing Sheets

SINGLE LENS REFLEX CAMERA

This application is a continuation of U.S. patent application Ser. No. 07/944,317, filed Sep. 14, 1992, pending.

BACKGROUND OF THE INVENTION

1. Field of the Invention

The present invention relates to a single lens reflex camera. More precisely, it relates to a single lens reflex camera having a mirror box which supports a mirror having up and down movement, a mirror driving mechanism which moves the mirror up and down, and a diaphragm control mechanism which controls a diaphragm.

2. Description of Related Art

In a known single lens reflex camera, a mirror (quick return mirror) and a mirror driving mechanism, which moves the mirror between an upper position (taking position) and a lower position (viewing position), are provided in a mirror box provided in a camera body. In addition, a diaphragm control mechanism is also provided in the mirror box to drive a diaphragm of a taking lens, which is mounted to the camera body, to a set diaphragm value. The diaphragm control mechanism is associated with the mirror driving mechanism, so that when a shutter button is depressed by a full step to turn a shutter switch ON, the mirror is moved in association therewith from the lower position to the upper position. When the mirror is moved up the diaphragm is stopped down.

Upon manufacturing a single lens reflex camera, it is necessary not only to examine and adjust the diaphragm control mechanism, but also to precisely adjust devices for stopping down the diaphragm to a predetermined aperture position. In a conventional single lens reflex camera in which both the diaphragm control mechanism and the mirror driving mechanism are provided in the mirror box, it is very difficult to independently, or separately, test or adjust the diaphragm control mechanism.

Furthermore, the incorporation of the diaphragm control mechanism and the mirror driving mechanism in the mirror box complicates the assembly.

SUMMARY OF THE INVENTION

The primary object of the present invention is to provide a single lens reflex camera in which a diaphragm control mechanism can be independently examined and adjusted, and in which a diaphragm control mechanism and mirror driving mechanism can be easily assembled.

To achieve the object mentioned above, according to the present invention, there is provided a single lens reflex camera comprising a mirror box provided in a camera body to support a mirror located on an optical axis of a taking lens to be moved up and down, and a diaphragm control mechanism detachably attached to the camera body and united with a member separate from the mirror box.

With this arrangement, it is possible to easily assemble the mirror driving mechanism and the diaphragm control mechanism, which increases the efficiency of the assembly operation. Furthermore, it is also possible to separately examine and adjust the diaphragm control mechanism.

If a single charge/reset mechanism, which charges a mirror driving mechanism and then resets the diaphragm control mechanism, is provided, it can be easily assembled in a camera together with the mirror driving mechanism and the diaphragm control mechanism, resulting in a simplified assembly.

In an embodiment of the present invention, the mounting member includes a rotatable main diaphragm latching lever, which constitutes the diaphragm control mechanism, and which rotates to reset the diaphragm control mechanism.

Preferably, the diaphragm control mechanism includes a slide plate which engages with the diaphragm association lever on the taking lens to be associated therewith. The mirror driving mechanism includes a diaphragm restricting lever which resets the slide plate to an initial position to open the diaphragm.

In an embodiment, the mounting plate is provided with a small diameter gear, which is in mesh with the rack formed on the slide plate, a large diameter gear coaxial to the small diameter gear, and a rotatable pulse plate which is in mesh with the large diameter gear, so that the rotation of the large diameter gear is transmitted to the pulse plate. A detecting mechanism for detecting an aperture diameter of the diaphragm in accordance with the rotation of the pulse plate, is also provided.

A single lens reflex camera according to the present invention further includes a detecting mechanism for detecting the aperture diameter of the diaphragm and a controller in the camera body, so that the detecting mechanism outputs detection data to the controller.

It is possible to provide an auxiliary diaphragm latching lever coaxial to the main diaphragm latching lever.

The main diaphragm latching lever can be rotated by a driving mechanism together with the auxiliary diaphragm latching lever, in accordance with a command signal from the controller. The driving mechanism can be realized by a solenoid, which is selectively energized in accordance with a control signal from the controller.

According to another aspect of the present invention, there is provided a single lens reflex camera comprising a mirror box, detachably mounted to a camera body, to support a mirror having up and down movement, a mirror driving mechanism which moves the mirror up and down, and a diaphragm control mechanism which controls a diaphragm, wherein the mirror driving mechanism is provided in the mirror box and the diaphragm control mechanism is mounted to a panel separate from the mirror box to form a unit independent from the mirror box, and detachably mounted to the camera body.

The present disclosure relates to subject matter contained in Japanese Utility Model Application No. 3-102253 (filed on Oct. 9, 1991) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

The illustrated embodiment of the present invention is applied to a single lens reflex camera having a strobe incorporated therein, in which the photometering operation is started when a shutter button is depressed by a half step and the shutter is released when the shutter button is depressed by a full step.

Figure 11:
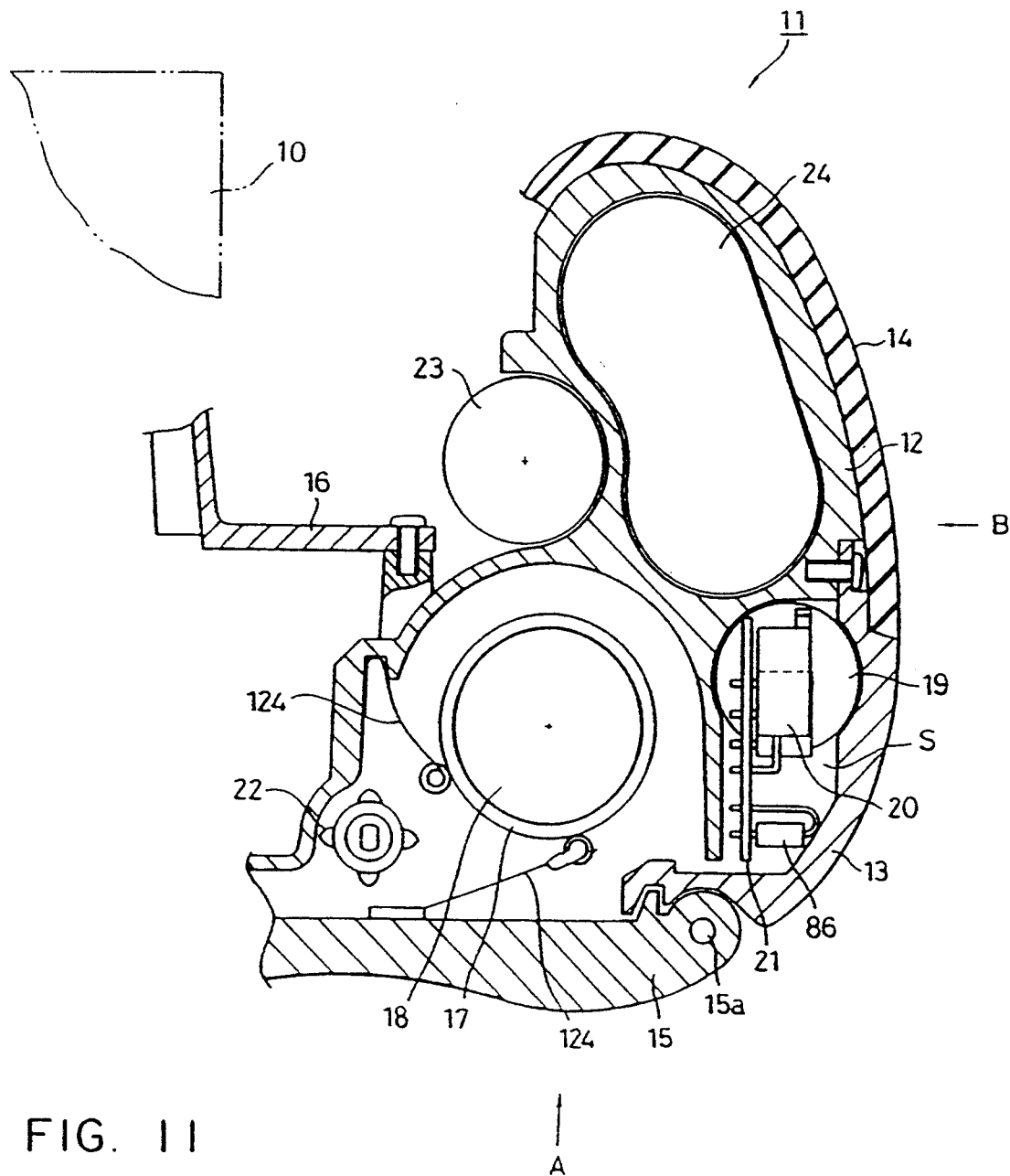
FIG. 11 is a sectional plan view of an internal construction of a camera grip portion of a single lens reflex camera.

As can be seen in FIG. 11, a grip portion 11 provided in a camera body 12 is provided with a grip rubber 14 on the front end thereof and a side cover 13 on the rear side thereof. A back cover 15 is pivoted with respect to the camera body through a pivot shaft 15a behind the grip portion 11. A spool 17, in which a charging motor 18 is housed, is rotatably mounted in the camera grip portion 11. A film motor 19, a strobe circuit 20, a strobe circuit board 21, a sprocket 22, a strobe main condenser 23, and a battery 24 are provided around the spool 17. The strobe main condenser 23 and the film motor 19 are located side by side and have lengthwise directions parallel to each other. Numeral 16 designates a front plate die casting secured to the camera body 12 by set screws to form a part of the camera body.

The spool 17 and its surroundings are discussed below, with reference to FIG. 12.

The charging motor 18 has an output shaft 18a which has a pinion 25 secured thereto. The pinion 25 is in mesh with a gear 26, which constitutes a reduction gear train 29 together with gears 27 and 28. Gear 28 is in mesh with a cam gear 32, rotatably supported on one end of a rotational shaft 61.

The cam gear 32, which constitutes a shutter/mirror charge mechanism 178, is integrally provided with a shutter cam 30 and a mirror cam 31 coaxial to the shutter cam 30, and is rotatably supported by the camera body 12 through the rotational shaft 61. Cam gear 32 is located substantially at a center of a mirror driving (charging) lever 33.

Figure 1:
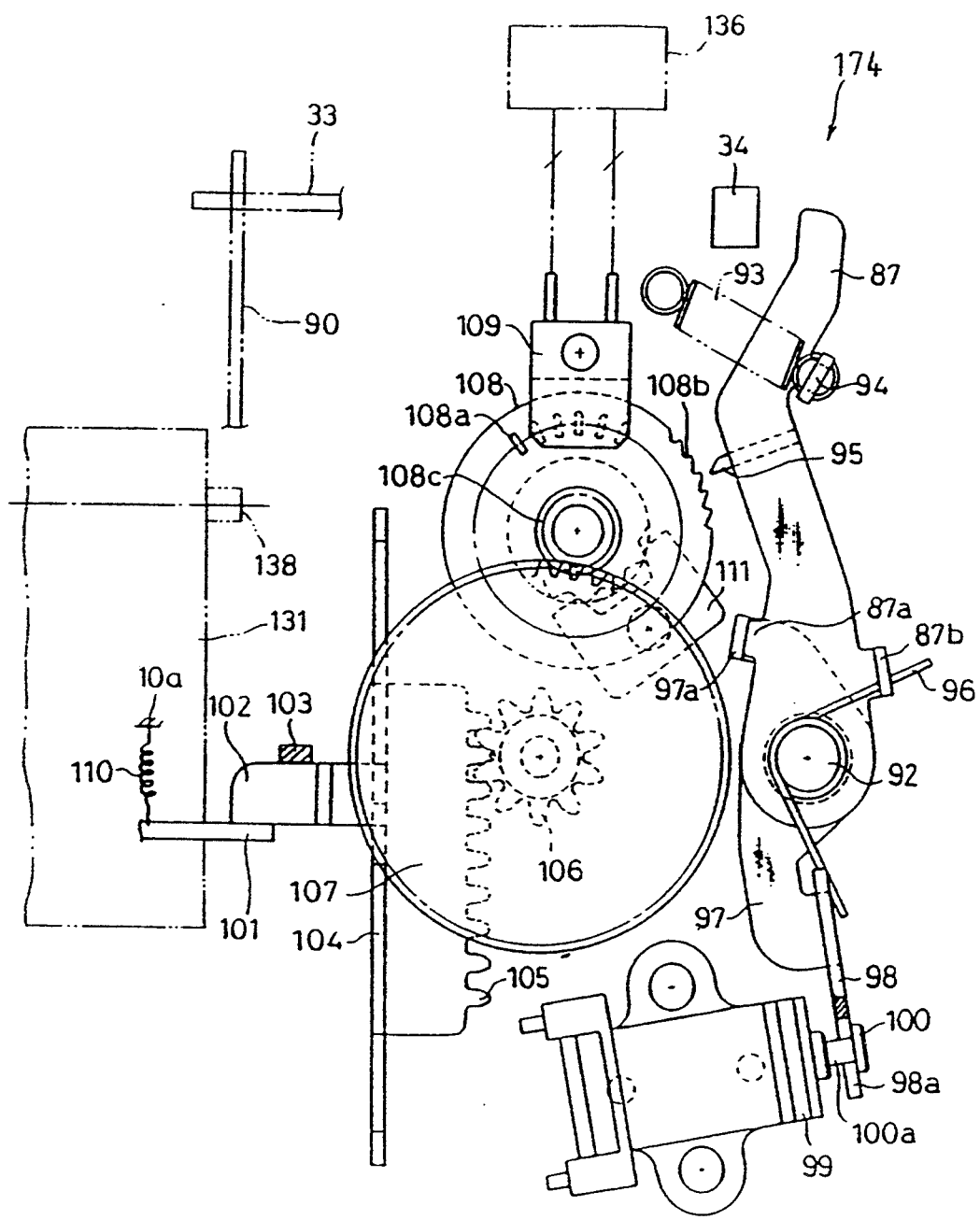
FIG. 1 is a side elevational view of a diaphragm control mechanism of a single lens reflex camera to which the present invention is applied, shown in a pre-release open position.

A diaphragm resetting lever 34 is rotatably mounted to the lower end of the rotational shaft 61 to reset a diaphragm driving mechanism 174 (FIG. 1). Consequently, the shutter cam 30, the mirror cam 31, and the diaphragm resetting lever 34 are coaxial to each other.

Figure 8:
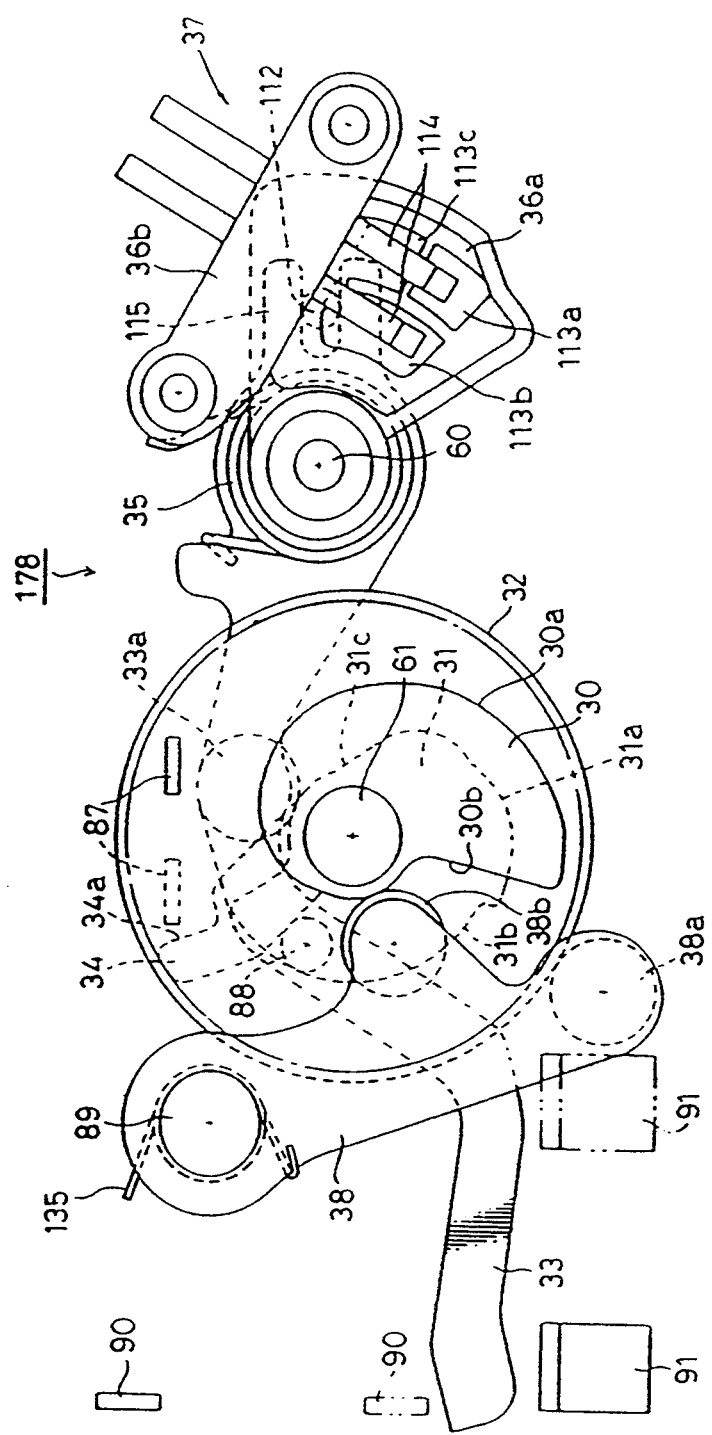
FIG. 8 is a plan view of a shutter/mirror charge mechanism in a pre-release position.

The shutter cam 30, which charges a shutter (not shown), has an involute cam surface 30a which gradually increases in diameter as it rotates, and a rear surface 30b as shown in FIG. 8.

The mirror cam 31, which drives a mirror 131 (FIG. 1), consists of a first cam surface 31a having the largest diameter, a second cam surface 31b having a diameter smaller than the diameter of the first cam surface 31a, and a rear surface 31c. The mirror driving lever (referred to as a mirror charge lever) 33, which constitutes the shutter/mirror charge mechanism 178, together with the mirror cam 31, is rotatably supported on the camera body 12 through a rotational shaft 60, and is continuously biased by a coil spring 35 in the counterclockwise direction in FIG. 8. The mirror charge lever 33 is provided on the lower intermediate portion thereof with a roller pin 33a and an association pin 88 spaced from the roller pin 33a. The mirror charge lever 33 rotates about the axis of the rotational shaft 60 when the roller pin 33a is depressed by the mirror cam 31, which rotates in the counterclockwise direction as shown in FIG. 8.

The diaphragm resetting lever (referred to as a reset lever) 34 is biased by a coil spring 134 in the counterclockwise direction to bear against the association pin 88 in FIG. 8. The reset lever 34 is rotated in the clockwise direction about the axis of the shaft 61 when it is depressed by the association pin 88, which is moved in accordance with the rotation of the mirror charge lever 33 in the same direction. A diaphragm latching lever 87 (FIG. 1) is depressed by the diaphragm resetting lever 34 to reset (open) the diaphragm of a taking lens 10 (FIG.

Mirror charge lever 33 depresses, at the front end (left end in FIG. 8) thereof, the mirror driving lever 90 which is moved between a lower position, in which the mirror 131 is moved down after the mirror charge is completed, as shown by a solid line in FIG. 8, and an upper position, in which the mirror 131 is moved up after the releasing operation, as shown by a two-dotted and dashed line in FIG. 8. The diaphragm latching lever 87 is moved between a stop-down position, after releasing, as shown in a two-dotted and dashed line, and a reset position in which the diaphragm control mechanism 174 (FIGS. 1 through 3) is reset, as shown by a solid line in FIG. 8, respectively.

A switch substrate 36a is mounted to the rotational shaft 60. The switch substrate 36a includes a pair of contacts 113b and 113c, which are not insulated from one another, and a contact 113a, which is insulated from the contacts 113b and 113c. The switch substrate 36a also has an association projection 112 projecting downward therefrom. The mirror charge lever 33 is provided, on an end thereof adjacent to the rotational shaft 60, with a bifurcated arm 115, which holds therein the association projection 112 to actuate the same. A switch lever 36b is secured to the camera body 12 having a bifurcated brush 114 which comes into slide contact with the contacts 113a, 113b, and 113c of the switch substrate 36a. The switch substrate 36a and the switch lever 36b constitute a one-rotation switch 37 which detects one-rotation (one turn) of the cam gear 32.

The shutter charge lever 38, which forms a shutter charging mechanism together with the shutter cam 30, is rotatably supported by a rotational shaft 89 and is continuously biased by a coil spring 135 in the counterclockwise direction in FIG. 8. The shutter charge lever 38 has a charge pin 38a on the front end thereof, and a roller pin 38b on the intermediate portion thereof, respectively. The roller pin 38b bears against the shutter cam 30 of the cam gear 32, so that when the roller pin 38b is pressed by the shutter cam 30, which is rotated in the counterclockwise direction in FIG. 8, the shutter charge lever 38 is rotated about the axis of the rotational shaft 89 in the clockwise direction. Numeral 91 designates an association lever which is pressed by the charge pin 38a, which is moved in accordance with the rotation of the shutter charge lever 38 in the clockwise direction to charge the shutter.

Figure 12:
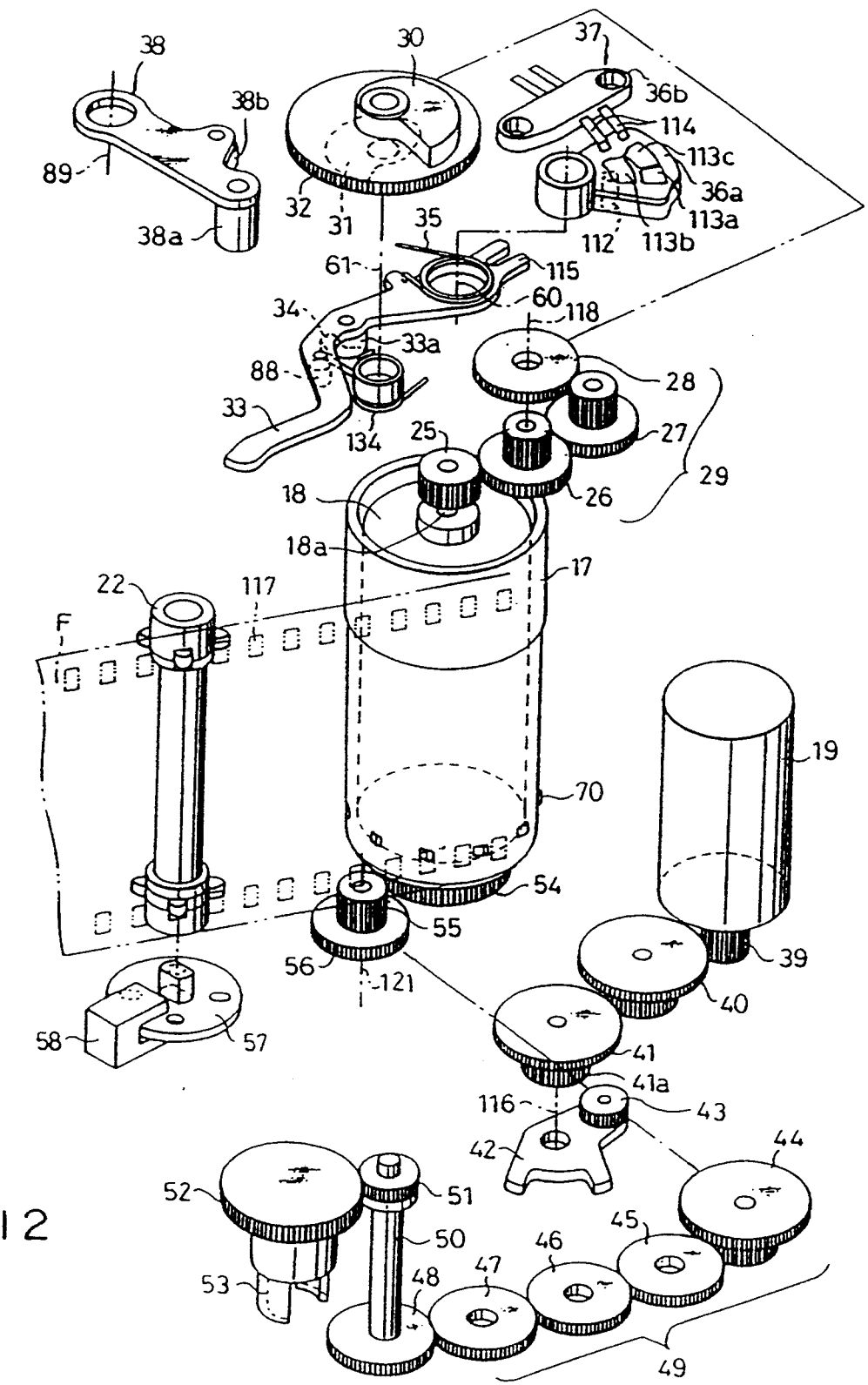
FIG. 12 is an exploded perspective view of a shutter/mirror charge mechanism and a film winding and rewinding mechanism; and, FIG. 13 is a partly broken front elevational view of a front plate die casting.

As shown in FIG. 12, a sun gear 41 and a planet lever 42 are provided on the camera body 12 in the vicinity of the film motor 19. The sun gear 41 and the planet lever 42 are coaxially mounted to the same rotational shaft 116, so as to rotate relative to each other. The planet lever 42 has a planet gear 43 which is in mesh with a small gear 41a of the sun gear 41. The sun gear 41 is engaged by a gear 40, meshing with the pinion 39, secured to the rotational shaft of the film motor 19, so that rotation of the film motor 19 can be transmitted through the gear 40.

There is a rewinding reduction gear train 49 having gears 44, 45, 46, 47, and 48 adjacent to the planet gear 43. When the planet gear 43 is moved angularly in the clockwise direction, together with the planet lever 42, by the rotation of the film motor 19, the planet gear 43 is engaged by the gear 44, adjacent thereto, to transmit the rotation thereof to a through shaft 50, a through shaft gear 51, and a rewinding gear 52, all of which elements are included in rewinding reduction gear train 49, to thereby rotate the rewinding fork 53 in the rewinding direction of the film.

A large diameter gear 56 and a small diameter gear 55, coaxial thereto and integral therewith, are rotatably supported on a rotational shaft 121 in the vicinity of the planet gear 43. The small diameter gear 55 is in mesh with a winding gear 54 provided on the peripheral end surface of the spool 17. When the planet gear 43 is rotated in the counterclockwise direction, together with the planet lever 42, by the rotation of the film motor 19, the planet gear 43 is engaged by the large diameter gear 56 to transmit the rotation thereof to the rewinding gear 54 through the small diameter gear 55. The spool 17 is thereby rotated in the film winding direction.

There is provided a sprocket 22 adjacent to the spool 17. The sprocket 22 is engaged by perforations 117 of the film F, so that the sprocket 22 can be rotated by the winding operation of the film F. The sprocket 22 is provided on the lower end thereof with a rotating plate 57 attached thereto, so that the number of revolutions of the rotating plate 57 is detected by a photointerrupter 58 to detect the amount of winding of the film F.

The diaphragm control mechanism 174, which controls the setting of the diaphragm at a predetermined aperture, and the diaphragm control mechanism unit 174', in which the diaphragm control mechanism 174 is mounted in unified fashion or united separately from the mirror box 130 to which the mirror driving mechanism 173 is mounted, will be described below with reference to FIGS. 1 through 3 and FIG. 7.

Figure 13:
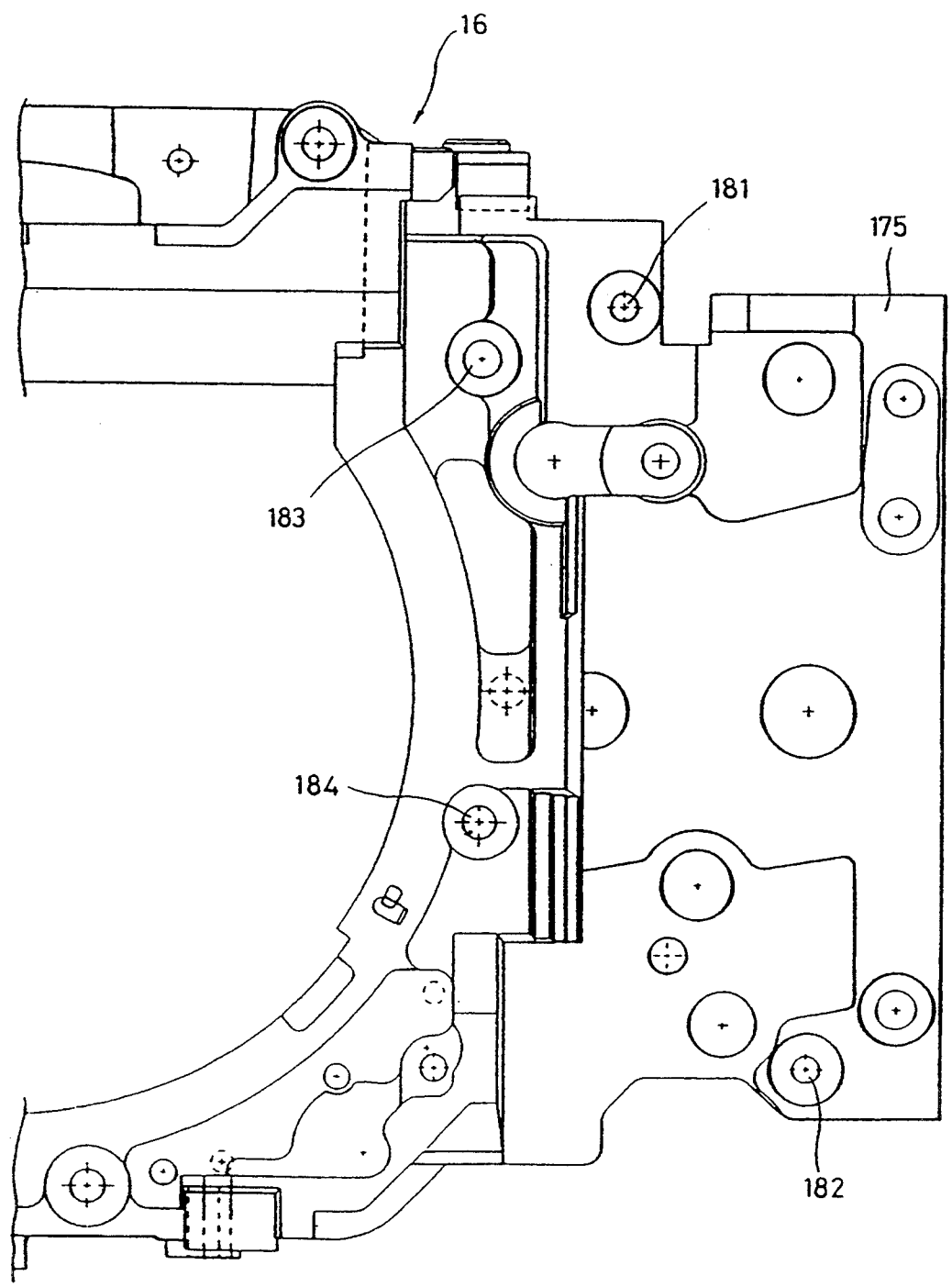

The diaphragm control mechanism unit 174' has a mounting panel 175 to be mounted to the front plate die casting 16 (FIGS. 11 and 13) through set screws 181 and 182. A main diaphragm latching lever 87, which bears at one end thereof against the diaphragm setting lever 34, is rotatably mounted to the mounting panel 175. The main diaphragm latching lever 87 is rotatably supported by the mounting panel 175 through the rotational shaft 92, and has a latch pawl 95 which can be engaged by latch teeth 108b of a pulse plate 108, which is rotatably supported by the mounting panel 175. The main diaphragm latching lever 87 is provided with a spring mounting portion 94, to which a return spring 93 is connected, to bias the main diaphragm latching lever 87 in the counterclockwise direction. The other end of the return spring is connected to the mounting panel 175.

An auxiliary diaphragm latching lever 97 is rotatably supported on the rotational shaft 92, coaxial with the main diaphragm latching lever 87. The auxiliary diaphragm latching lever 97 has a receiving projection 97a at one end thereof and an association lever 98 at the other end. A connecting coil spring 96, which is wound about the rotational shaft 92, is connected to a spring engaging portion 87b formed on the rear side of the main diaphragm latching lever 87 at one end thereof and connected to the association lever 98 at the other end. Consequently, the main diaphragm latching lever 87 is biased in the counterclockwise direction in FIG. 1 and 7. The main diaphragm latching lever 87 has an engaging projection 87a which can be engaged by the receiving projection 97a during rotation in the counterclockwise direction. This allows for the main diaphragm latching lever 87 and the auxiliary diaphragm latching lever 97 to be rotated together in the counterclockwise direction, as viewed in FIG. 1.

Below the auxiliary diaphragm latching lever 97, there is provided a diaphragm solenoid 99, also provided on mounting panel 175, which has a plunger 100 with a shaft portion 100a. Shaft portion 100a is engaged in an association cut-away groove 98a of the association lever 98. Consequently, the auxiliary diaphragm latching lever 97 is rotated and held in the counterclockwise direction or in the clockwise direction by the plunger 100 of the solenoid 99, which is projected and retracted when the solenoid 99 is activated or inactivated, respectively. As a result, the pulse plate 108 is latched or unlatched.

A rack supporting plate 104 is supported on the mounting panel 175 by two slide supporting mechanism 177 (FIG. 7), so as to be slid up and down. Rack supporting plate 104 has a rack 105 which is in mesh with a small diameter gear 106, coaxial to a large diameter gear 107, provided adjacent the main diaphragm latching lever 87. The taking lens 10 (FIG. 11) has a diaphragm adjusting lever (on the lens side) which is movable up and down in association with the diaphragm, and which is biased upwardly by a return spring 110 connected at one end thereof to the lens barrel 10a of the taking lens 10, as viewed in FIG. 1. The rack supporting plate 104 is provided, on the side thereof, opposite rack 105, with a slide plate 102 which engages with the diaphragm adjusting lever 101 when the taking lens 10 is mounted to the camera body 12. This allows for the rack supporting plate 104 to be biased by the return spring 110 through the adjusting lever 101 to bias the rack supporting plate 104 upwardly. A (mirror side)

swing lever 103 is provided so as to come into contact with the slide plate 102.

Pulse plate 108 has a large number of pulse holes 108a along a circle concentric the pulse plate 108, a large number of latch teeth 108b provided on the outer peripheral surface of the pulse plate 108, and a small diameter gear 108c coaxial to and integral with the pulse plate 108. An escapement mechanism 111 is provided for engaging with circumferentially provided notches or teeth in a plate mounted coaxially with pulse plate 108 to render the motion of plate 108 intermittent. The mechanism 111 includes a pivotedly mounted double armed lever, individual arms of which are alternately and intermittently engaged with spaced notches provided on the plate.

A diaphragm photointerrupter 109 is provided on the mounting panel 175 adjacent to the pulse plate 108 to detect the displacement of the rotating pulse holes 108a to thereby detect the number of revolutions and the angular position of the pulse plate 108. Since the elements which constitute the diaphragm control mechanism unit 174' are integrally assembled on the mounting panel 175 to make an assembly unit, as mentioned above, the assembly unit can be easily mounted to the front plate die casting 16 (camera body 12) and can be independently or solely examined and adjusted.

Figure 4:
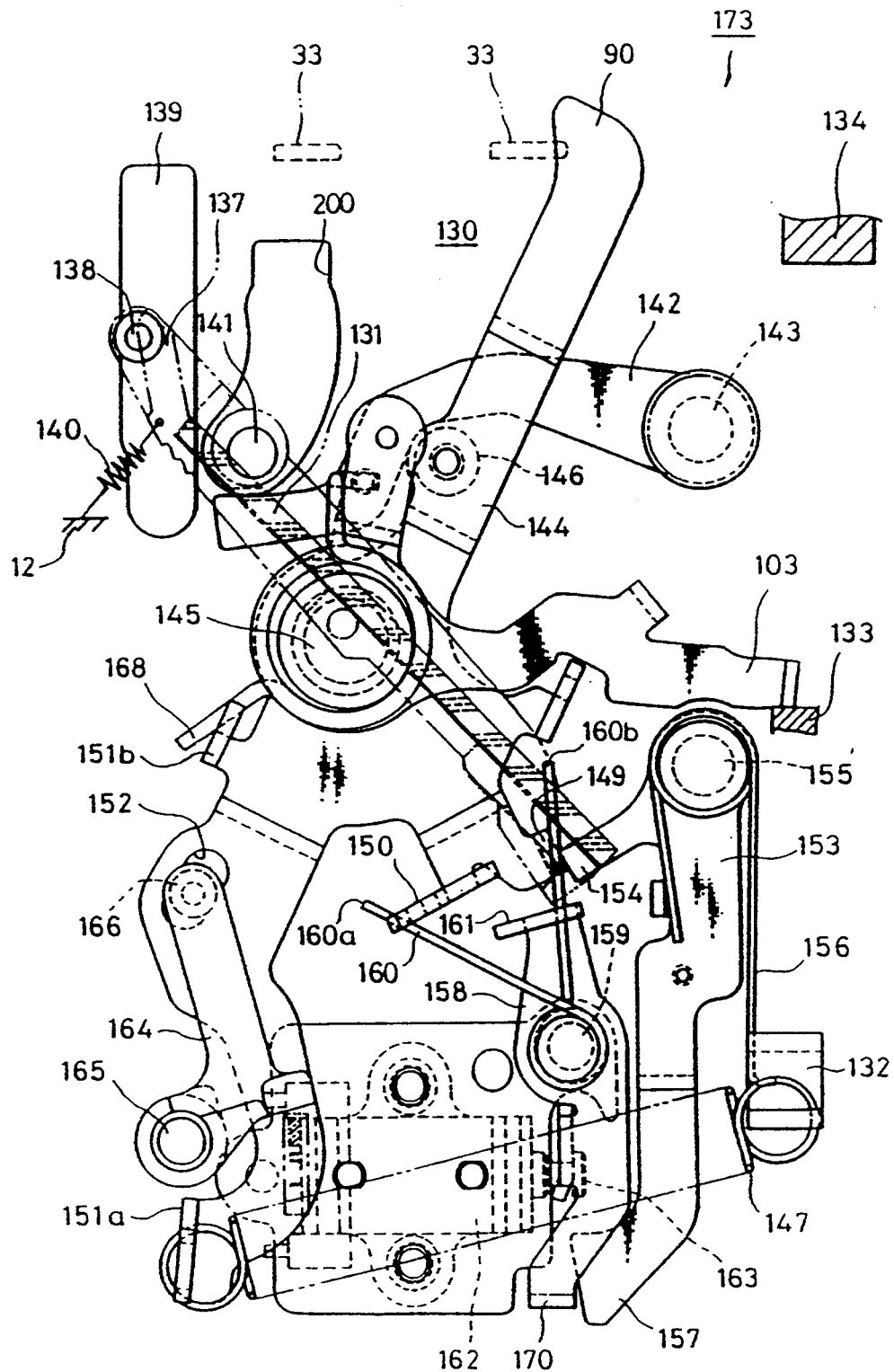
FIG. 4 is a side elevational view of a mirror driving mechanism of a single lens reflex camera, shown in a charged position.
Figure 6:
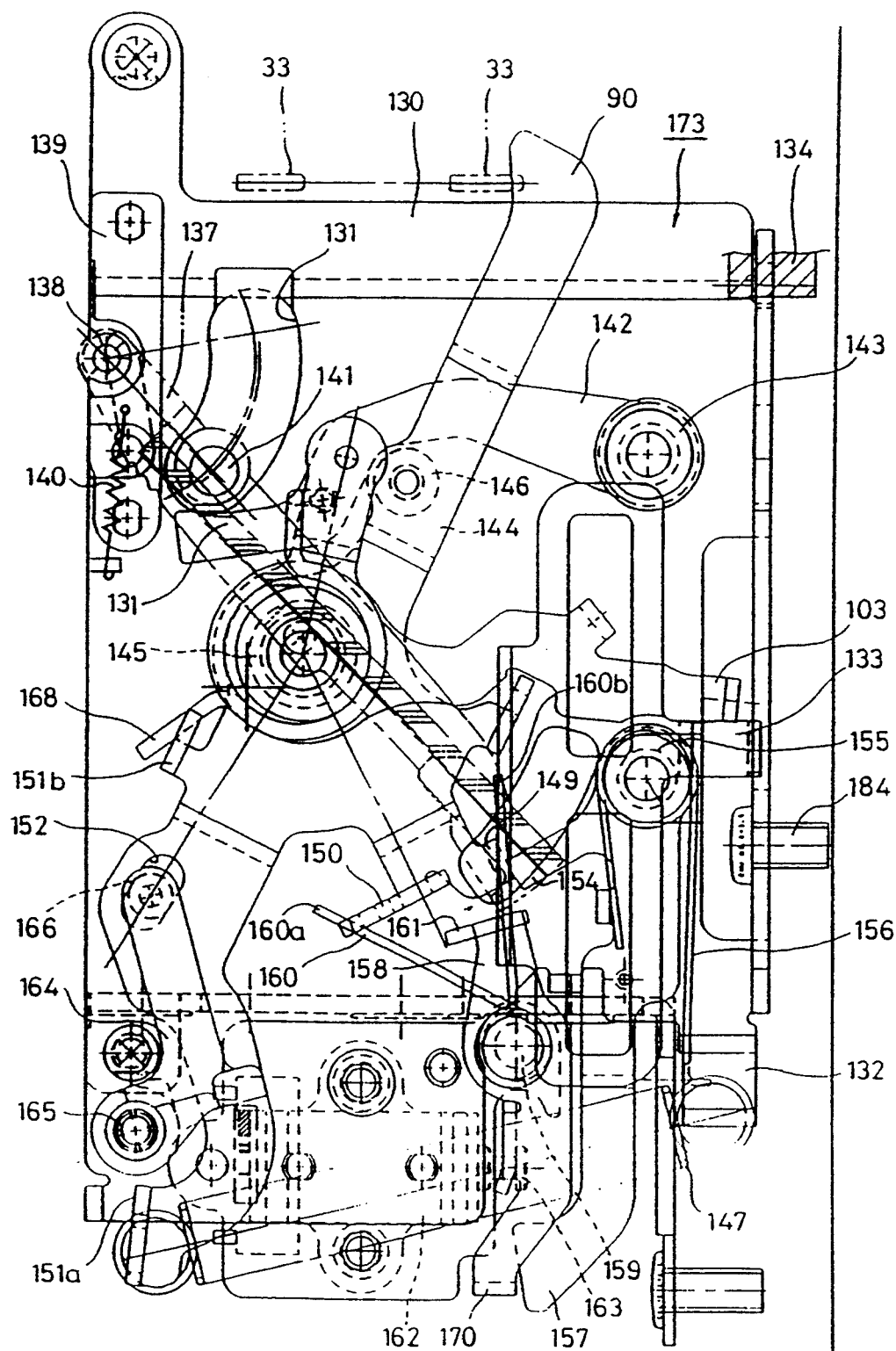
FIG. 6 is a side elevational view of a mirror driving mechanism mounted to a mirror box.
Figure 7:
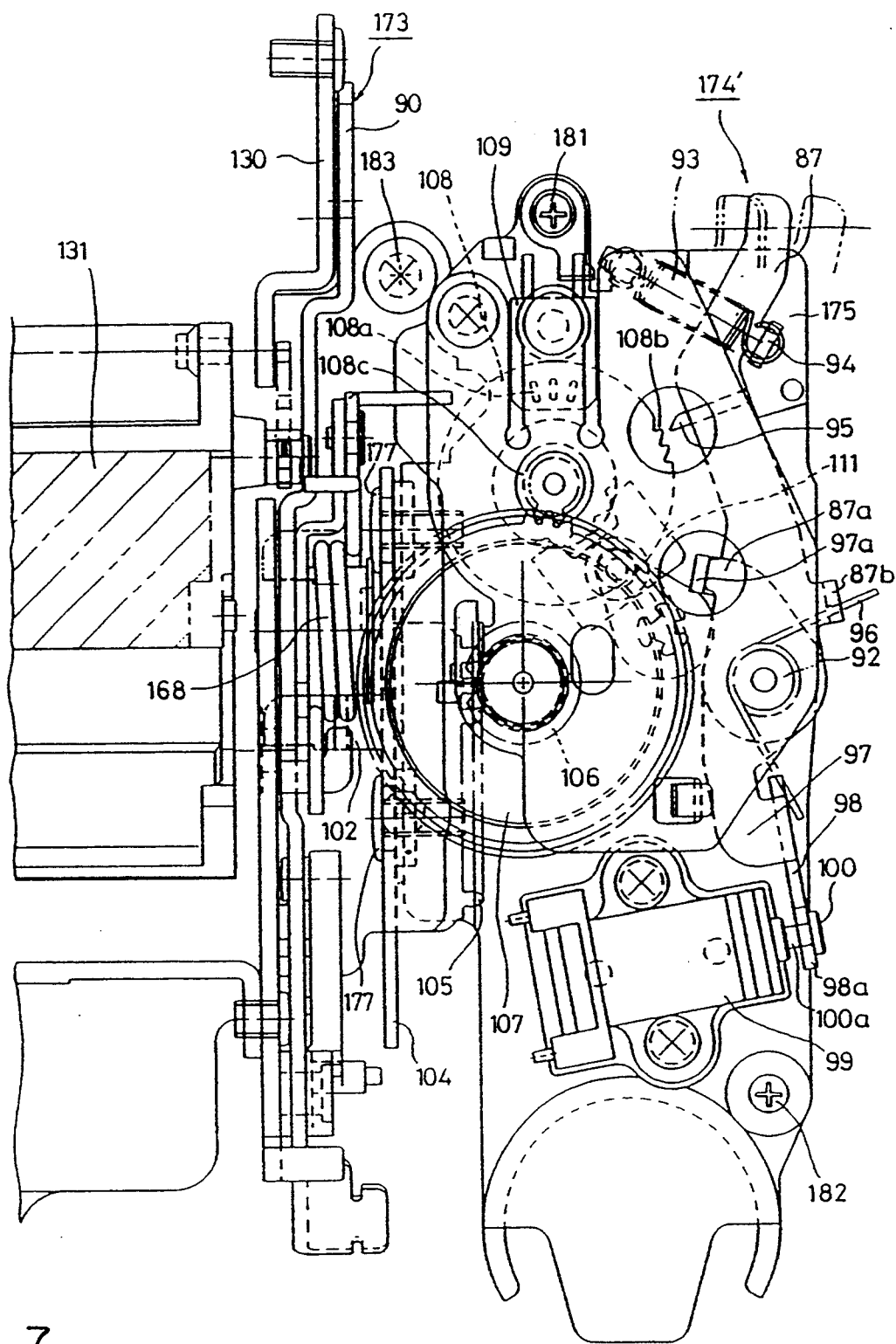
FIG. 7 is a side elevational view of a diaphragm control mechanism unit mounted to a mirror box.

In FIG. 4, which shows the mirror driving mechanism 173 shown in a mirror charge position, and FIG. 6 which shows the mirror driving mechanism 173 mounted to the mirror box 130 shown in a mirror charge position, the mirror box 130, provided in camera body 12 has open front, rear, and upper ends. A mirror 131, secured to a mirror sheet 137, is housed in the mirror box 130. The mirror sheet 137 is pivoted to the mirror box 130 by a shaft 138 provided at the upper end of the mirror box 130 through a sheet bearing 139, so that the mirror sheet 137 is rotatable about the shaft 138 between the viewing position and the taking position (photographic position). The mirror sheet 137 is continuously biased by a mirror returning spring 140, provided between the mirror box 130 and the mirror sheet 137, into the viewing position. On the side face of the mirror sheet 137 is provided a mirror driving pin 141, which projects outward through a window 200 formed in the mirror box 130.

On the outer side of the mirror box 130 a mirror elevating lever 142, which comes into sliding contact with the mirror driving pin 141, is pivoted through a shaft 143. The mirror driving pin 141, and accordingly, the mirror 131 and the mirror sheet 137 are moved (rotated) upwards to the taking position against the mirror returning spring 140 by the rotation of the mirror elevating lever 142 in the clockwise direction (upward direction of the mirror).

A mirror elevating collar 146, provided on the driving lever 144, bears against the mirror elevating lever 142 from the side opposite the mirror driving pin 141. The driving lever 144 is rotatably supported by a shaft 145 on the outer side of the mirror box 130. A mirror elevating spring 147 is provided between an engaging piece 151a, formed on the lower end of the driving lever 144, and an engaging piece 132 secured to the mirror box 130. The driving lever 144 is biased, to move the mirror upwardly (counterclockwise direction), by the mirror elevating spring 147.

Mirror association lever 90 of the driving lever 144 comes into contact with the mirror charge lever 33, which is driven in the charge direction (rightward direction in FIG. 4) by the shutter/mirror charging mechanism shown in FIG. 8, upon winding the film, and is returned to the initial position when the charge is completed.

The driving lever 144 is rotated in the charging direction to apply tension to the mirror elevating lever 142 by the movement of the mirror charge lever 33 in the charge direction. The driving lever 144 is held in the mirror charge completion position in which the engaging piece 149 engages with the engaging piece 154 of the engaging lever 153 in the viewing position of the mirror 136.

Engaging lever 153 is pivoted to the mirror box 130 through a shaft 155, and is biased by an engaging lever returning spring 156, around the shaft 155, in a direction to engage the engaging pieces 154 and 149 to thereby engage the driving lever 153. The engaging lever 153 is provided with an association portion 157, which is driven at the front end thereof by a drive arm portion 170 of a mirror disengaging lever 158.

Mirror disengaging lever 158 is provided between the driving lever 144 and the engaging lever 153, and is pivoted to the mirror box 130 through a shaft 159. The mirror disengaging lever 158 is biased by a disengaging and shock absorbing spring 160 provided around the shaft 159. The disengaging and shock absorbing spring 160 is provided on opposite ends thereof with abutting portions 160a and 160b, which are engaged by the engaging pieces 149 and 161 of the driving lever 144 and the mirror disengaging lever 158, to bias the same in the disengaging direction in the charge completion position, respectively.

The mirror disengaging lever 158 is connected to the plunger 163 of the mirror solenoid 162, which is secured to the mirror box 130. The plunger 163 is biased by a built-in spring (not shown) in a direction to be retracted in the solenoid and attracted by a permanent magnet (not shown)When the mirror solenoid 162 is energized, the magnetic force of the permanent magnet is cancelled, so that the plunger projects from the solenoid to rotate the mirror disengaging lever 158 in the disengaging direction by the biasing force of the disengaging and shock absorbing spring 160.

Driving lever 144 is associated with a shutter mechanism disengaging lever 164 and a diaphragm restricting lever 103. The shutter mechanism disengaging lever 164 is pivoted to the mirror box 130 through a shaft 165 and has an association pin 166 provided on one end thereof and fitted in an elongated hole 152 formed in the driving lever 144. The shutter mechanism disengaging lever 164 disengages a shutter mechanism engaging device (not shown) in association with the rotation of the driving lever 144 to move the mirror upward, so that the shutter curtain can be moved by the electromagnetic control.

The diaphragm restricting lever 103 is rotatably mounted to the shaft 145 and is elastically connected to the driving lever 144 through an association spring 168 provided around the shaft 145. The association spring 168 is connected at one end thereof to the driving lever 144 and at the other end thereof to the engaging piece 151b of the diaphragm restricting lever 103. When a taking lens 10 is mounted to the camera in the mirror charge position, the diaphragm restricting lever 103 abuts against a stop 133, provided on the mirror box 130, and is brought to a stop. When the taking lens 10 is mounted to the camera body 12, the diaphragm restricting lever 103 presses the diaphragm adjusting lever 101 on the lens side through the slide plate 102 downwards to open the diaphragm. When the driving lever 144 is rotated in a direction to move mirror upwardly, the diaphragm restricting lever 103 is rotated together, through the association spring 168, to release the biasing force of the diaphragm adjusting lever 101 of the taking lens 10.

Mirror box 103, which is formed as a unit to which the mirror driving mechanism 173 is mounted, is secured to the front plate die casting 16 (camera body 12) by set screws 183 and 184 (FIGS. 6 and 7) and two other set screws (not shown). Since only the mirror driving mechanism 173 is mounted to the mirror box 130 and no diaphragm control mechanism 174 is mounted thereto, it is possible to easily assemble the mirror driving mechanism 173. Furthermore, mounting of the mirror driving mechanism 173 to the front plate die casting 16 can be simplified.

In a single lens reflex camera, as constructed above, when the film F is wound by one frame, and when the shutter charge and mirror charge are completed (before releasing), the shutter charge mechanism and the mirror charge mechanism are in a position shown in FIG. 8. In this state, the shutter charge lever 38 is in an initial position in which the roller pin 38b bears against the rear portion 30b of the shutter cam 30, and the mirror charge lever 33 is in an initial position in which the roller pin 33a bears against the rear portion 31c of the mirror cam 31, respectively.

Figure 2:
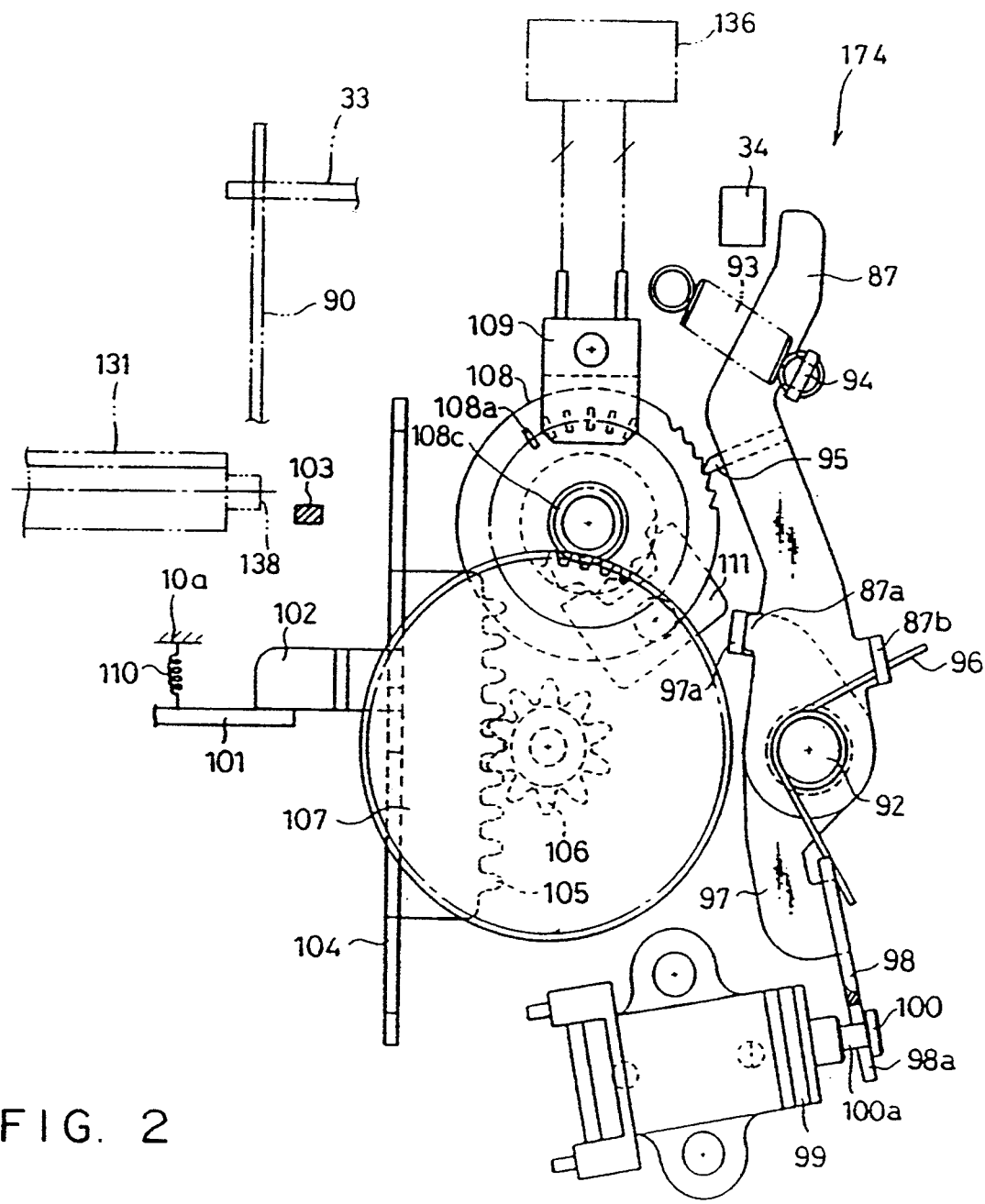
FIG. 2 is a side elevational view of a diaphragm control mechanism of a single lens reflex camera to which the present invention is applied, shown in a stop-down position after the releasing operation.
Figure 3:
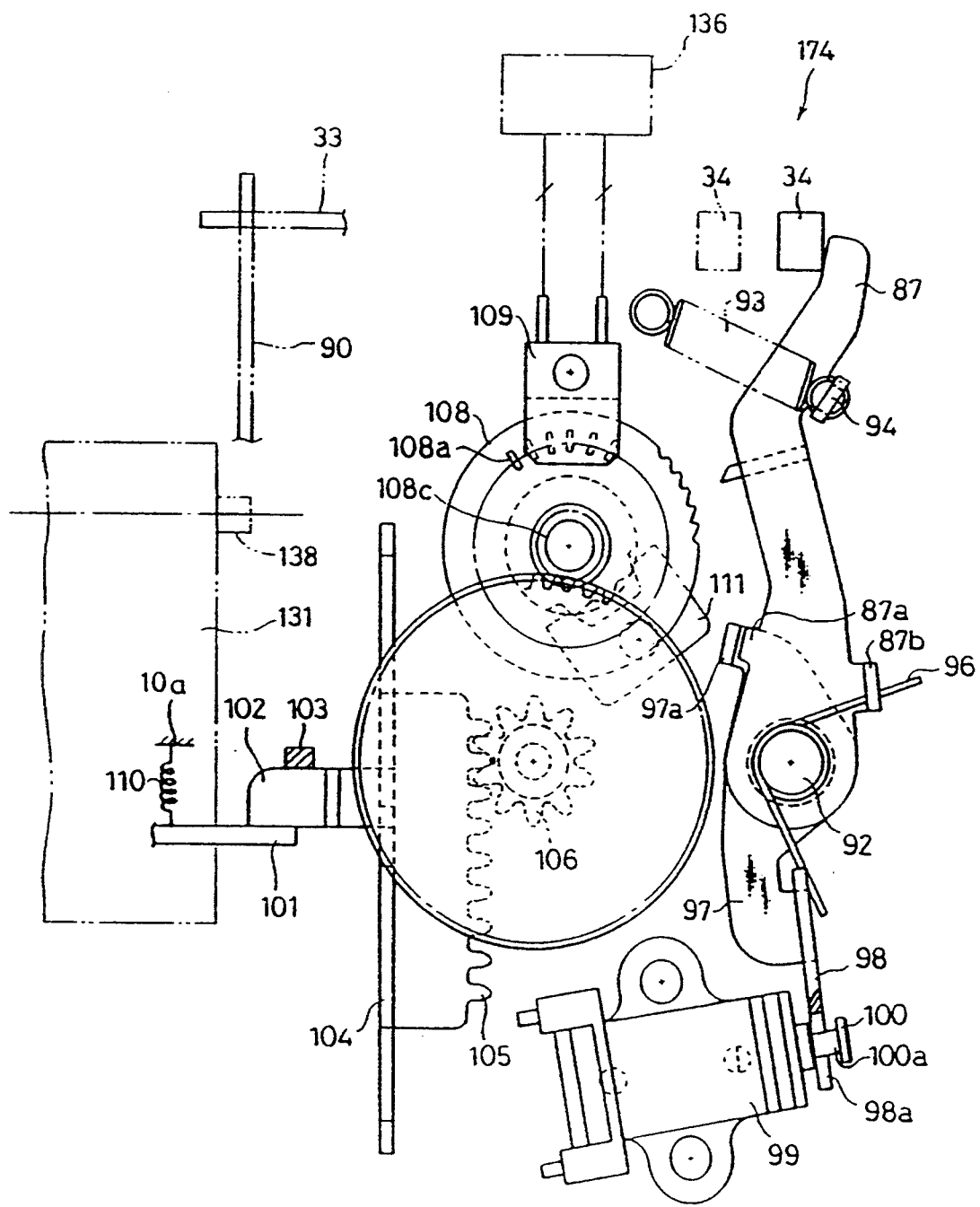
FIG. 3 is a side elevational view of a diaphragm control mechanism of a single lens reflex camera to which the present invention is applied, shown in a position immediately before the completion of the diaphragm resetting operation, after the exposure is completed.

Shutter association lever 91 and the mirror association lever 90 are in a shutter charge completion position and a mirror charge position shown at solid lines in FIG. 2, respectively. Since the mirror charge lever 33 is in the angular end position in the counterclockwise direction, the association arm 115 moves the switch board 36a to a position shown in FIG. 2, relative to the switch lever 36b, through the association projection 112. Consequently, the two brushes 114 contact with the contacts 113a and 113b.

In the diaphragm driving mechanism 174, the swing lever 103 on the mirror side holds the slide plate 102 in a position shown in FIG. 1. The diaphragm adjusting lever 101 on the lens side is held, in a position shown in FIG. 1, against the return spring 110. In this state, the diaphragm of the taking lens 10 is in a fully open position. The main diaphragm latching lever 87 is rotated in the clockwise direction by the retraction of the plunger of solenoid 99, which is energized through the association lever 98 and the auxiliary diaphragm latching lever 97. The latch pawl 95 is then disengaged from the latch teeth 108b, and the pulse plate 108 is released.

When the shutter button is depressed by a half step, the photometering is commenced. When the shutter button is fully depressed thereafter, the mirror association lever 90 is moved to a position shown at a two-dotted and dashed line from a position shown at a solid line in FIG. 8, in association with the operation of the release switch (not shown), so that the mirror 131 is moved up to a photographable position in which a picture can be taken. Namely, when the release switch is turned ON in the position at which the mirror is charged, shown in FIG. 4, the mirror solenoid 162 is energized, as so that the plunger 163 projects to rotate the mirror disengaging lever 158 in the disengaging direction against the biasing force of the disengaging and shock absorbing spring 160. The rotation of the mirror disengaging lever 158 causes the driving arm portion 170 to come into contact with the association portion 157 of the engaging lever 153 to thereby rotate the latter in the disengaging direction against the engaging lever returning spring 156. As a result, the engaging piece 154 is disengaged from the engaging piece 149. Accordingly, the driving lever 144 is rotated in the upwards direction of the mirror, toward the taking position, by the spring force of the mirror elevating spring 147.

When the driving lever 144 is rotated to elevate the mirror, the mirror elevating collar 146 comes into sliding contact with the mirror elevating lever 142 to rotate the same in the direction that elevates the mirror. The mirror elevating lever 142 comes into sliding contact with the mirror driving pin 141 to rotate the mirror 136 and the mirror sheet 137 in the mirror elevation direction toward the taking position, against the mirror returning spring 140. The upward movement of the mirror 131 is stopped in the taking position, when it comes into contact with the elastic stop 134 provided on the mirror box 130.

The rotation of the driving lever 144 in the mirror elevation direction causes the abutting portion 160a of the disengaging and shock absorbing spring 160 to move, releasing the elastic restoring force, in accordance with the movement of the engaging piece 150 and in the direction that reduces the angle defined by the abutting portions 160a and 160b. During the movement, the abutting portion 160a of the disengaging and shock absorbing spring 160 comes into contact with the engaging portion 161 of the mirror disengaging lever 158 to bias the mirror disengaging lever 158 in the engaging direction (clockwise direction)The other abutting portion 160b comes into contact with the engaging piece 150 immediately before the completion of the rotation and is moved to open the abutting portions 160a and 160b. Namely, the disengaging and shock absorbing spring 160 biases the driving lever in the mirror elevation direction when the driving lever is held in the viewing position. The direction of the biasing force is inverted immediately before the taking position to bias the driving lever 144 in the mirror lowering direction, Consequently, the driving lever 144 receives the elastic biasing force in the mirror lowering direction from the disengaging and shock absorbing spring 160, immediately before the completion of the upward movement of the mirror, and rotates the mirror disengaging lever 158 in the returning direction through the disengaging and shock absorbing spring 160. Consequently, a shock of the driving lever, which would otherwise occur upon stopping, can be absorbed or eliminated, thereby damping the oscillation.

When the upward movement of the mirror 131 is completed, the mirror 136 is held in the taking position by the restoring force mirror of the elevating spring 147 through the mirror driving lever 144 and the mirror elevating lever 142. The mirror and the disengaging lever 158 is held in the engaging position to retract the plunger 163 by the restoring force of the disengaging and shock absorbing spring 160, so that the engaging lever 153 is held in the engaging position by the restoring force of the engaging lever returning spring 156 in the engaging direction.

Movement of the mirror association lever 90 toward the taking position causes the diaphragm restricting lever 103 to move upwardly, with reference to FIG. 1, so that the diaphragm adjusting lever 101 on the lens side, whose upward movement is restricted by the slide plate 102, is moved upward. Thus, the stopping down of the diaphragm, which has been in a fully open position, is commenced.

As a result, the rack 105, which is moved upwardly together with the slide plate 102, rotates the large diameter gear 107 through the small diameter gear 106 in the clockwise direction. Consequently, the small diameter gear 108c, and accordingly, the pulse plate 108, are rotated in the counterclockwise direction through the large diameter gear 107.

Diaphragm photointerrupter 109 detects the displacement of the pulse holes 108a of the pulse plate 108 as a pulse number corresponding to the variation of the diaphragm. The detected data is sent to a controller 136 which compares the data with a predetermined value. When the diaphragm becomes an aperture diameter corresponding to the predetermined value, the diaphragm solenoid 99 is energized.

As a result, the latching lever 87, disengaged from the auxiliary diaphragm latching lever 97, is rotated in the counterclockwise direction by the return spring engaging the latch pawl 95 with the latch teeth 108a, as shown in FIG. 2. Consequently, the rotation of the pulse plate 108 is restricted. Accordingly, no further movement of the slide plate 102 is permitted through the large diameter gear 107 and the rack 105. Therefore, the diaphragm adjusting lever 101 on the lens side is stopped at an optimum diaphragm value position through the slide plate 102.

Figure 5:
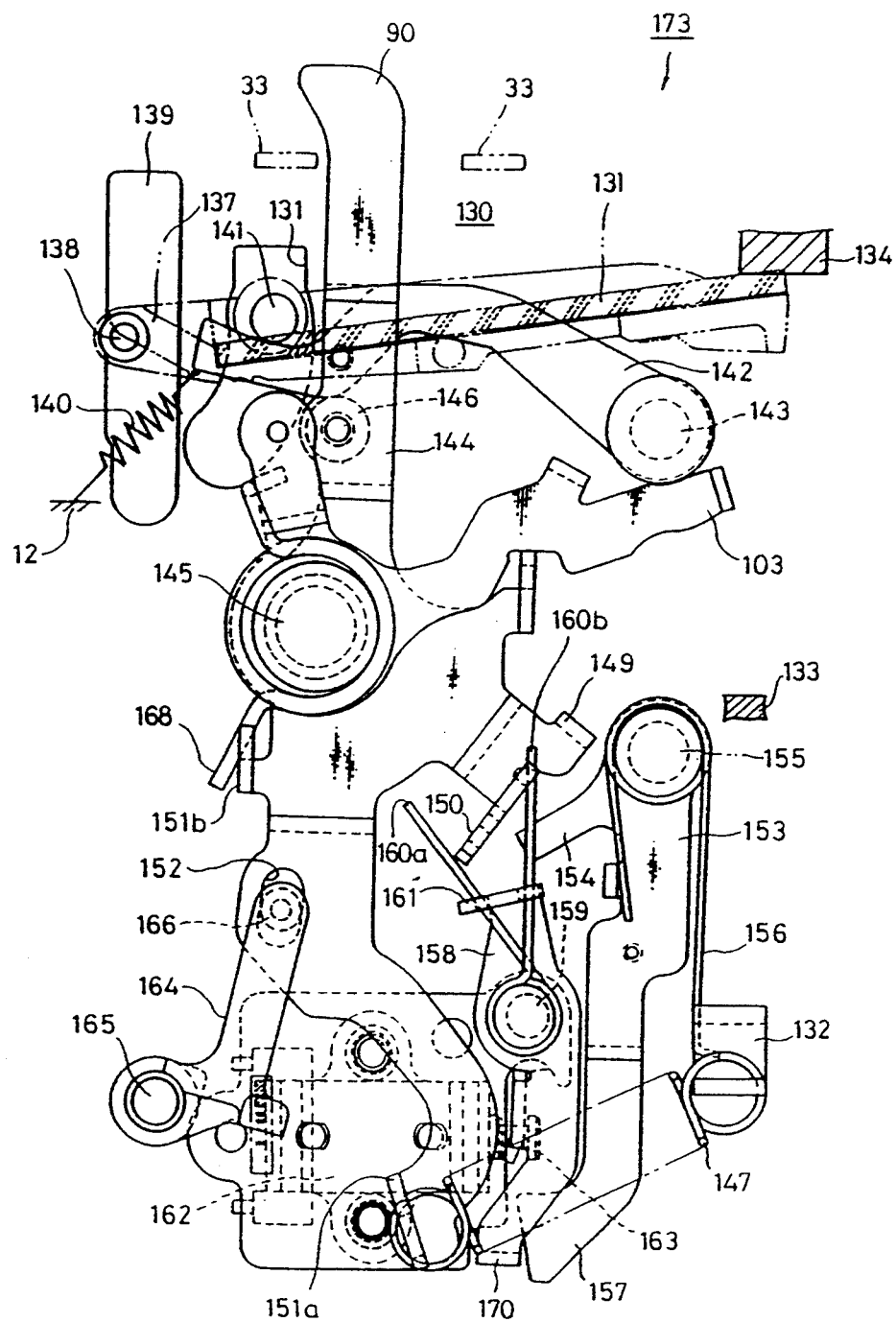
FIG. 5 is a side elevational view of a mirror driving mechanism shown in an upper position thereof.

When the shutter button is depressed by a full step, after the movement of the shutter curtain is completed, while the mirror is in the upward position, the charging motor 18 is rotated in the charge completion direction. The mirror cam 32 of the cam gear 32, which has been rotated in the counterclockwise direction, through the pinion gear 25 and the gears 26, 27 and 28, depresses the roller pin 33a outwardly through the first cam surface 31a. Consequently, the mirror charge lever 33 is rotated about the rotational shaft 60 to depress and move the mirror association lever 90, located in the position shown at a two-dotted and dashed line in FIG. 8, i.e., in the position shown in FIG. 5 in the upward direction in FIG. 8 (i.e., right direction in FIG. 5) through the front end of the mirror charge lever 33. As a result, the driving lever 144 is rotated in the mirror lowering direction, so that the mirror 131 is rotated downward (in the clockwise direction in FIG. 5) by the restoring force of the mirror returning spring 140, into the viewing position.

During the downward movement of the mirror toward the viewing position, the shoulder portion of the engaging piece 149 comes into sliding contact with the upper edge of the engaging piece 154 to rotate the engaging lever 153 against the engaging lever returning spring 156 in the disengaging direction. When the charging operation is completed, the engaging piece 149 is disengaged from the upper edge of the engaging piece 154, so that the engaging lever 153 is rotated in the charging direction to engage the engaging piece 149 and the engaging piece 154. Consequently, the driving lever 144 is engaged in the charging position to be returned to the position shown in FIG. 4. Since the abutting portion 160a of the disengaging and shock absorbing spring 160, which biases the mirror disengaging lever 158 for disengaging the driving lever 144, comes into contact with the engaging piece 150 to bias the driving lever 144 in the braking direction when the driving lever 144 reaches near the uppermost position, the driving lever 144 and the mirror 136 are suddenly braked by the elastic biasing force of the disengaging and shock absorbing spring 160, to thereby dampen or absorb the shock and oscillation, when the movement thereof is brought to a stop.

Similarly, the shutter cam 30, which rotates together with the mirror cam 31, moves the roller pin 38b outwards through the cam surface 30a to rotate the shutter charge lever 38 in the clockwise direction in FIG. 8. As a result, the charge pin 38a moves the shutter association lever 91 in the left direction in FIG. 8 to charge the shutter after the operation. The rotation of the mirror charge lever 33 causes the switch board 36a to rotate in the clockwise direction through the association arm 115 and the association projection 112, so that the brushes 114, which have been in contact with the contacts 113a and 113b insulated from one another, come into contact with the contacts 113b and 113c which are interconnected (FIG. 9).

At the same time, the rotation of the mirror charge lever 33 causes the association pin 88 to move in the direction of the rotation of the lever 33 to depress and rotate the diaphragm reset lever 34 in the clockwise direction in FIG. 2. As a result, the main diaphragm latching lever 87, which has been in a position shown at a two-dotted and dashed line in FIG. 8, is moved by the diaphragm reset lever 34 in the reset direction of the diaphragm against the return spring 93 (i.e., rightward direction as viewed in FIGS. 2 and 8) to come to a position shown in FIGS. 3.

Figure 9:
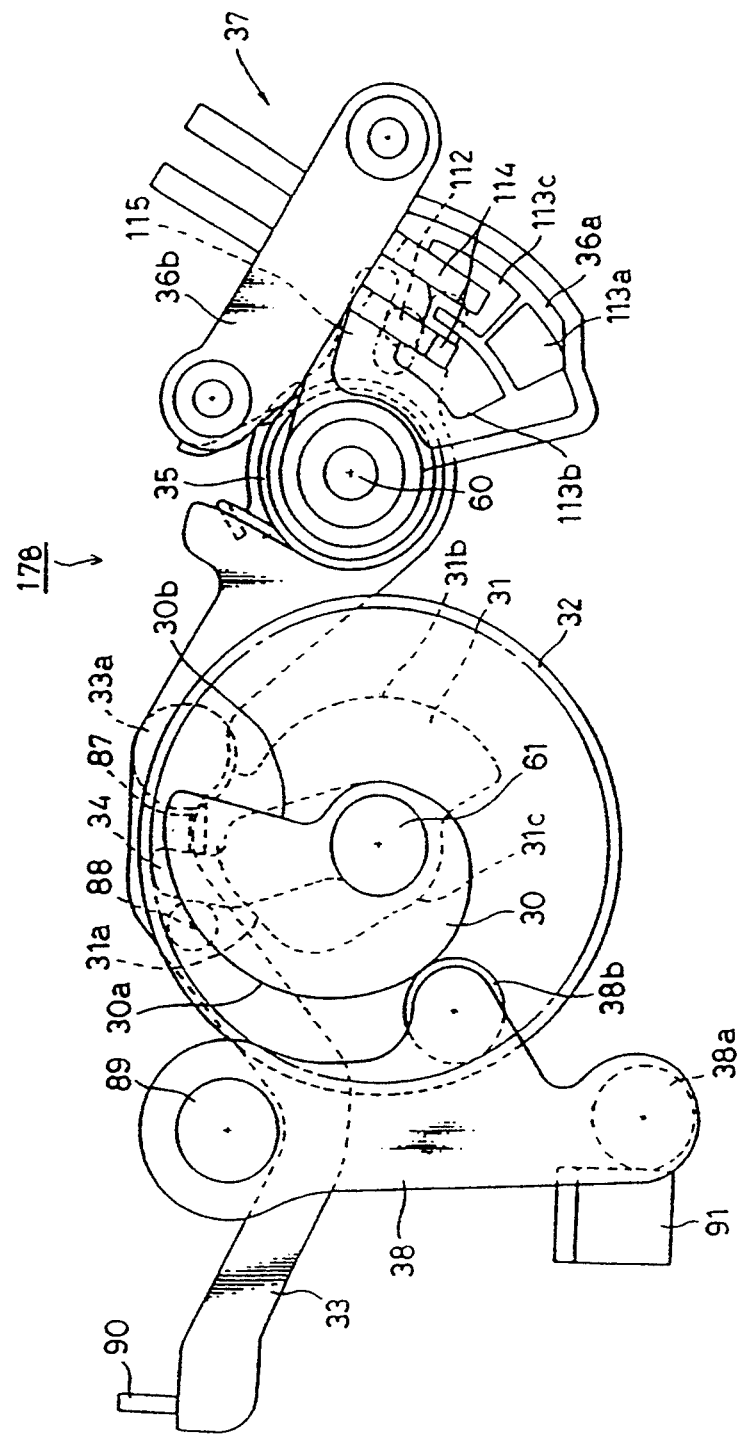
FIG. 9 is a plan view of a shutter/mirror charge mechanism in a position immediately before the completion of the mirror charging operation after the releasing operation is completed.

Further rotation of the cam gear 32 from the position shown in FIG. 9, in the same direction, causes the shutter charge lever 38 to rotate in the clockwise direction through the cam surface 30a which gradually increases the diameter in accordance with the rotation of the cam gear. Consequently, the shutter association lever 91 is moved to the shutter charge completion position (FIG. 10) through the charge pin 38a.

Mirror charge lever 33, which has been rotated by the first cam surface 31a of the large diameter to the angular end position in the clockwise direction to move the mirror association lever 90 to the mirror charge position, gradually moves the front end thereof away from the mirror association lever 90. The rotation of the mirror charge lever 33 causes the association pin 88 to rotate in the same direction, so that the diaphragm reset lever 34 is rotated in the counterclockwise direction by the coil spring 134 (FIG. 12) to come to the position away from the latch lever 87, shown at a two-dotted and dashed line in FIG. 3. Since the plunger 100 is attracted by the permanent magnet of the diaphragm solenoid 99, the main diaphragm latching lever 87, which tends to rotate in the clockwise direction by the spring force of the return spring 93, slightly rotates in the same direction, but further rotation of the main diaphragm latching lever 87 is restricted by the head of the plunger 100. Accordingly, the main diaphragm latching lever 87 is held in the diaphragm reset position shown in FIG. 1.

Figure 10:
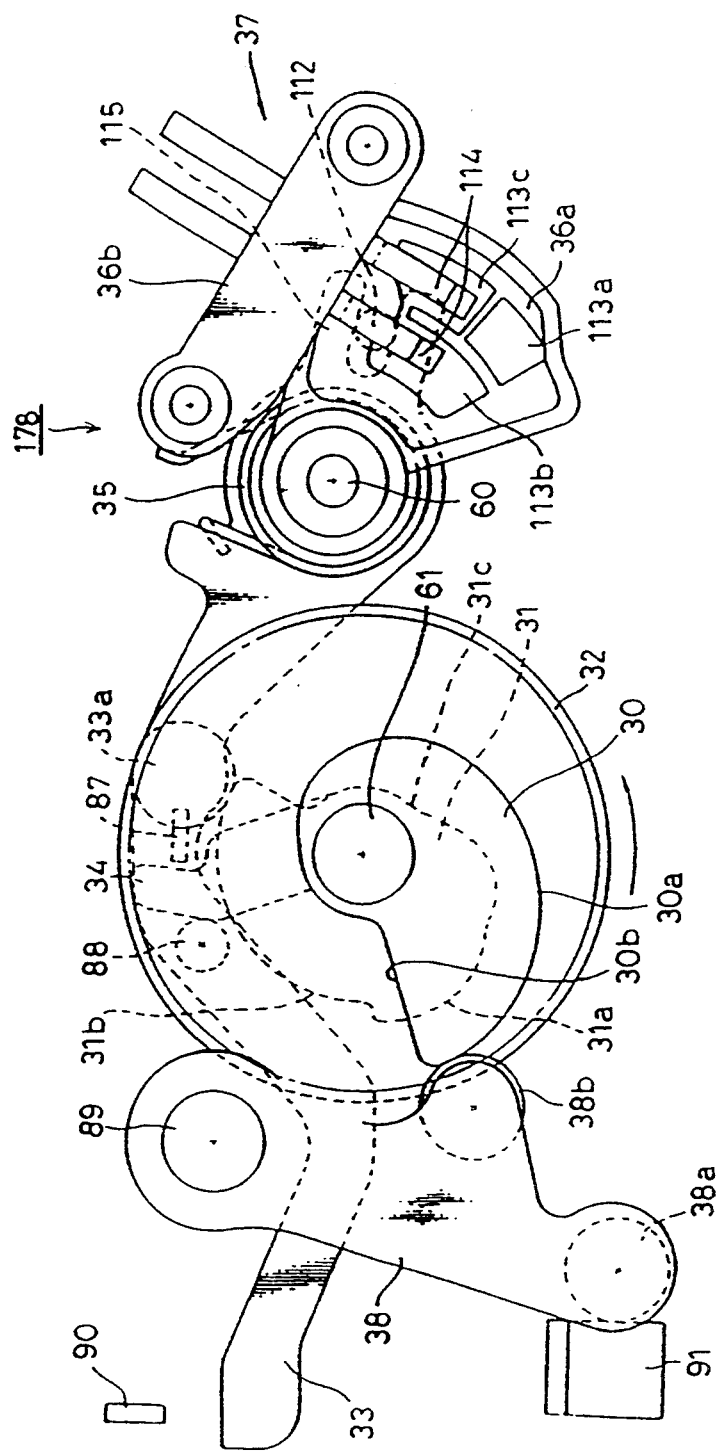
FIG. 10 is a plan view of a shutter/mirror charge mechanism in a position immediately before the completion of the shutter charging operation after the releasing operation is completed.

When the cam gear 32 rotates further from the position shown in FIG. 10, the mirror charge lever 33 rotates until the roller pin 33a comes into contact with the rear portion 31c, since the roller pin 33a is released from the second cam surface 31b. At the same time, the shutter charge lever 38 rotates until the roller pin 38b comes into contact with the shutter cam 30b, since the roller pin 38b is released from the cam surface 30a. The rotation of the mirror charge lever 33 causes the switch board 36a to rotate in the counterclockwise direction through the association arm 115 and the association projection 112. As a result, brushes 114, which have been in contact with the contacts 113b and 113c, come into contact with the contacts 113b and 113a, so that one rotation of the cam gear 32 is detected by one-turn switch 37. The detection signal is output to the controller 136 to stop the rotation of charge motor 18, so that the shutter charge mechanism and the mirror charge mechanism are both returned to the respective initial positions.

Upon completion of the shutter release, the film motor 19 is rotated in the film winding direction in accordance with the drive signal of the film motor 19 output from the controller 136. Consequently, the planet lever 42 is rotated in the clockwise direction in FIG. 12 by the small diameter gear 41a which rotates in the counterclockwise direction in FIG. 12 to engage the planet gear 43 with the large diameter gear 56. Consequently, the spool 17 is rotated in the counterclockwise direction (winding direction) in FIG. 12, through the large diameter gear 56, the Small diameter gear 55, and the winding gear 54 to wind the film F. Upon winding the film F, the number of revolutions of the rotating plate 57, which is rotated in accordance with the movement of the film F, is detected by the photointerrupter 58. Accordingly, the film motor 19 is stopped in accordance with the detection signal of the controller 136, when the film F is wound by one frame.

When a rewinding switch (not shown) is turned ON after all the frames of the film F are exposed, the film motor 19 is rotated in the film rewinding direction, in accordance with the signal of the controller 136. The rotation of the sun gear 41, which is caused by the rotation of the film motor 19, causes the planet lever 42 to rotate in the clockwise direction together with the planet gear 43 to engage the latter with the sun gear 44. Consequently, rotation of the film motor 19 is transmitted to the gear 44 and the rewinding reduction gear train 49 through the planet gear 43, so that the rewinding fork 53 is rotated through the through shaft 50, the through shaft gear 51, and the rewinding gear 52 to rewind the exposed film F into the patrone chamber opposite the spool 17.

Although the embodiment of the present invention discussed above is applied to a single lens reflex camera having a strobe incorporated therein, the present invention can be applied to a single lens reflex camera to which an external strobe can be detachably attached.

As can be seen from the above discussion, according to the present invention, since the mirror driving mechanism is provided in the mirror box which can be detachably mounted to the camera body, and the diaphragm control mechanism is mounted to the panel to form the diaphragm control mechanism unit which can be detachably attached to the camera body through the panel, the mirror driving mechanism and the diaphragm control mechanism can be easily assembled with a high efficiency. Furthermore, since the diaphragm control mechanism unit is separate and independent from the mirror box, it is possible to separately and independently examine and adjust the diaphragm control mechanism. Accordingly, for example, the adjusting operation to realize an optimum detection of the diaphragm value, by the photointerrupter, can be easily carried out. In addition to the foregoing, if there is provided a single charge/reset mechanism for charging the mirror driving mechanism and resetting the diaphragm control mechanism, the charge/reset mechanism can be easily assembled in the camera together with the mirror driving mechanism and the diaphragm control mechanism, thus resulting in a simple assembly of the camera.

Although the invention has been described with reference to particular means, materials and embodiments, it is not limited to the particulars disclosed and extends to all equivalents within the scope of the claims.

The disclosure of the present application is related to copending, concurrently filed application Ser. Nos. 0794,277 and 07/944,318, the disclosures of which are hereby expressly incorporated herein by reference in their entireties.

We claim:

1. A single lens reflex camera comprising:
   a mirror box provided in a camera body, said mirror box comprising means for supporting a mirror, located on an optical axis of a photographing lens, for up and down movement, said mirror box and said mirror comprising a unit which is detachably attachable to a camera body;
   means for driving said mirror for up and down movement in accordance with a shutter release operation, said mirror driving means being operable when said driving means is charged, said mirror driving means being assembled to said mirror box;
   a diaphragm control mechanism for controlling an aperture size of a diaphragm, said diaphragm control mechanism mounted to a mounting member, separate from said mirror box, said mounting member and said diaphragm control mechanism comprising a unit which is detachably attachable to said camera body;
   charge/reset means for charging said driving means and for resetting said diaphragm control mechanism, wherein said charge/reset means charges said mirror driving means to render said mirror driving means operable, and reset said diaphragm control mechanism so that an aperture size of a diaphragm is changeable between a full open state and a smallest state;
   means for mounting said charge/reset means to said camera body; and
   said charge/reset means comprising means for mechanically and functionally connecting said mirror driving means and said diaphragm control mechanism.

2. The single lens reflex camera according to claim 1, said charge/reset means comprising a rotatable main diaphragm latching lever comprising said diaphragm control means which rotates to reset said diaphragm control mechanism.

3. The single lens reflex camera according to claim 2, said charge/reset means comprising a diaphragm resetting lever which rotates said main diaphragm latching lever in a reset direction.

4. The single lens reflex camera according to claim 1, further comprising a photographing lens mounted to said camera body, said diaphragm provided in said photographing lens.

5. The single lens reflex camera according to claim 4, said photographing lens comprising a diaphragm association lever which is associated with said diaphragm and which is biased in a stop-down direction of the diaphragm.

6. The single lens reflex camera according to claim 5, said diaphragm control mechanism comprising a slide plate which engages with said diaphragm association lever on said photographing lens.

7. The single lens reflex camera according to claim 6, said mirror driving means comprising a diaphragm restricting lever which resets said slide plate to an initial position, to open said diaphragm.

8. The single lens reflex camera according to claim 5, said mounting member, to which said diaphragm control mechanism is mounted, is secured to a front plate die casting of said camera body, and means for securing said mounting member to said camera body.

9. The single lens reflex camera according to claim 8, said mounting member comprising a panel secured to said front plate die casting, said securing means comprising set screws which secure said mounting member to said front plate die casting.

10. The single lens reflex camera according to claim 9, said panel comprising an auxiliary diaphragm latching lever coaxial with said main diaphragm latching lever and comprising said diaphragm control mechanism.

11. The single lens reflex camera according to claim 5, further comprising a rack supporting plate which is slidably mounted on a mounting panel, said rack supporting plate supporting a slide plate engagable by said diaphragm association lever of said photographing lens.

12. The single lens reflex camera according to claim 1, said mounting member comprising a rack supporting plate mounted for sliding movement on said mounting member, said mounting member further comprising a first gear which is in mesh with a rack formed on said plate, a second gear coaxial with said first gear, a rotatable pulse plate in mesh with said second gear, wherein rotation of said second gear is transmitted to said pulse plate, and means for detecting an aperture of said diaphragm in accordance with rotation of said pulse plate, said detecting means mounted on said mounting member.

13. The single lens reflex camera according to claim 12, further comprising a controller mounted in said camera body, and means for transmitting detection data output by said detection means to said controller.

14. The single lens reflex camera according to claim 13, further comprising an auxiliary diaphragm latching lever coaxially mounted with respect to a main diaphragm latching lever comprising said diaphragm control mechanism.

15. The single lens reflex camera according to claim 14, further comprising driving means for rotating said main diaphragm latching lever together with said auxiliary diaphragm latching lever in accordance with a command signal from said controller.

16. The single lens reflex camera according to claim 15, wherein said pulse plate is provided, on an outer peripheral surface, with latch teeth, wherein said main diaphragm latching lever is rotated by said driving means at a predetermined timing to engage with selected latch teeth to stop rotation of said pulse plate.

17. The single lens reflex camera according to claim 16, said driving means comprising a solenoid which is selectively energized in accordance with a control signal from said controller.

18. The single lens reflex camera according to claim 1, further comprising a single charging motor, said charging motor coupled to said charge/reset means.

19. The single lens reflex camera according to claim 18, further comprising a gear mounted for rotation about an axis and operatively coupled to said motor, said charge/reset means comprising drive means mounted for rotation coaxially with the rotation axis of said gear and operatively engaged with said mirror driving means and said diaphragm control mechanism.

20. The single lens reflex camera according to claim 19, said drive means comprising first and second cam surfaces.

* * * * *